US 6,307,930 B1

(12) United States Patent
Mayer

(10) Patent No.: US 6,307,930 B1
(45) Date of Patent: Oct. 23, 2001

(54) METHOD FOR PROVIDING TELEPHONE ACCESS TO AN INTERNET USER CONNECTED TO PLURAL BONDED TELEPHONE LINES

(75) Inventor: Daniel Jitzchak Mayer, Warren, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/174,821

(22) Filed: Oct. 19, 1998

(51) Int. Cl.[7] .......................... H04M 11/00; H04M 3/42; H04M 15/06; H04L 12/16
(52) U.S. Cl. .................. 379/215.01; 379/93.01; 379/142.06; 370/259; 370/352
(58) Field of Search .................. 379/215, 142, 379/93.1; 370/259, 352

(56) References Cited

U.S. PATENT DOCUMENTS

| | | | |
|---|---|---|---|
| 5,805,587 | | 9/1998 | Norris ................................... 370/352 |
| 5,809,128 | * | 9/1998 | McMullin ............................ 379/215 |
| 6,078,581 | * | 6/2000 | Shtivelman et al. ................. 370/352 |
| 6,144,644 | * | 11/2000 | Bajzath et al. ........................ 370/259 |

OTHER PUBLICATIONS

*Shotgun Technology Q& A*, Diamond Multimedia; http://www.diamondmm.com/shotgun/q&a.html, Oct. 2, 1998.
*What makes Shotgun Technology Unique?*, Diamond Multimedia; http://www.diamondmm.com/shotgun/manual.html, Oct. 2, 1998.
*Bonded Analog Modems—More Bandwidth Using Standard Analog Lines*, Steve Clark, Boardwatch Magazine, Jan. 1998; http://www.boardwatch.com/mag/98/jan/bwm84.html, Oct. 2, 1998.

\* cited by examiner

*Primary Examiner*—Harry S. Hong
*Assistant Examiner*—Thjuan P. Knowlin

(57) ABSTRACT

The present invention is directed to methods for allowing phone lines to be used in a bonding scheme while retaining the ability to make or receive calls on those lines without terminating the entire data transmission. When a incoming call to one of the lines in use is detected, the call is rerouted to a specially configured server. Via the Internet, this server notifies the computer using the bonding scheme and coordinates the rerouting of the data transmission to the one or more other phone lines being bonded so that the requested line can be released and made available to connect the call. When the call is completed, the line can be returned to use as part of the bonded data transmission. When an outgoing call needs to be made, the computer using the bonding scheme is notified via an electronic signal. The computer then coordinates the rerouting of the data transmission to the one or more other lines being used in the bonding scheme and releases the line for the outgoing call. Once the outgoing call is complete, the line can be returned to use as part of the bonded data transmission.

18 Claims, 5 Drawing Sheets

METHOD FOR PROVIDING TELEPHONE ACCESS TO AN INTERNET USER CONNECTED TO PLURAL BONDED TELEPHONE LINES

FIELD OF THE INVENTION

The present invention is directed to methods for allowing an individual who is using two or more phone lines in a bonding scheme for data transmission to be able to accept incoming and make outgoing calls without disconnecting the entire data transmission. The present invention allows the individual to add and release phone lines from the data transmission as necessary to use the phone lines for incoming and outgoing calls.

BACKGROUND OF THE INVENTION

As the popularity level and the amount of content on the Internet has grown so has the demand for greater bandwidth for the home user. Since conventional analog modems have nearly reached their physical limitations, other transmission methods, such as Integrated Services Digital Network (ISDN), Digital Subscriber Line (DSL), and cable modems have begun to emerge as alternatives with greater bandwidth than a single analog modem. However, due to the significantly higher costs and limited availability of these options, analog modem manufacturers and Internet Service Providers (ISP) have started employing bonding schemes, in which two or more analog modems are used over a corresponding number of analog phone lines to multiply the bandwidth for a single network connection. This results in a significant increase in bandwidth at a relatively low cost to the consumer and ISP.

An example of a known configuration for a bonding scheme is shown in FIG. 1. Computer terminal 101 connects through the Public Switched Telephone Network (PSTN) 102 to an ISP 103 using bonded phone lines 104 and 105. Phones 106 and 107 at the same facility as the computer terminal also use lines 104 and 105 to make voice and or fax calls.

Protocols for implementing these bonding schemes already exist. Specifically, Bandwidth Allocation Control Protocol (BACP) and Multichannel Protocol Plus (MP+) manage the links, in this case phone lines, which make up the network connection and allow for individual links to be added and dropped as needed without affecting the other links.

A problem with these bonding schemes is that the use of the additional phone lines for data transmission prevents voice or fax calls from being placed or received on those lines. When computer 101 is using lines 104 and 105 for data transmission, phones 106 and 107 can neither make nor receive calls.

A technology known as "Shotgun" used by Diamond Multimedia allows a user to manually add and release the second phone line of the bonded pair. This manual operation is accomplished at the computer terminal with which the bonding scheme is being used. "Shotgun" also allows incoming calls on lines equipped with call waiting technology. When a call waiting signal is transmitted from the PSTN on the second phone line of the bonded pair, that line is automatically released from the bonding scheme so that the call may ring through while the data transmission continues on the first line. However, this approach has several shortcomings in that it does not allow an individual to choose to ignore an incoming call, it requires that call waiting service be subscribed to on the phone line to service incoming calls, and to make an outgoing call it requires an individual to manually release the second voice line at the computer terminal.

Technology already exists to intercept incoming calls on a phone line that an individual is using for a data connection, to notify the individual that there is an incoming call, and to allow the individual to elect how to handle the call. This technology is described in U.S. Pat. No. 5,805,587, CALL NOTIFICATION FEATURE FOR A TELEPHONE LINE CONNECTED TO THE INTERNET, issued Sep. 8, 1998. This approach has shortcomings in that it does not allow an individual to maintain separate voice and data connections, nor does it allow an individual to make outgoing calls.

SUMMARY OF THE INVENTION

The present invention allows a plurality of phone lines to be used in a bonding scheme, for example for data transmission, while retaining the ability to make or receive calls on any one or more of those lines without the need to terminate the data transmission on all of the lines.

In the present invention when a phone line is being used for data transmission as part of a bonding scheme and an individual desires to make a phone call on that line, the computer involved in the data transmission detects a signal from the phone that the individual wants to use for the call indicating that the line is needed for an outgoing call. The computer then takes appropriate steps to: reroute all of the data transmission to the one or more other phone lines being used in the bonding scheme; terminate all transmissions on the phone line to be used for the outgoing call; and disconnect from that phone line thus allowing the individual to use it for outgoing calls. The computer may also periodically check to see if the phone line is still being used for outgoing calls and when such use ceases the computer may once again use that line for data transmission. This method only requires that the individual's computer be configured to detect a signal from the phone that the line is needed for outgoing calls, no configuration of the infrastructure of the PSTN is required.

In order to receive incoming calls on a phone line being used in a bonding scheme, an individual must subscribe to a service provided by the telephone carrier. In this service, when a line is in use any incoming calls are redirected to a server on the Internet. This server contacts the computer involved in the bonding scheme via the Internet, alerting the user that there is an incoming call or automatically releasing the line for the incoming call if the user has previously configured the service to do so. The computer can then release one of the lines just as for outgoing calls, and the incoming call can be connected through on the released line. As with the method for outgoing calls the computer may periodically check the line and resume using it for data transmission once the call has ended.

DETAILED DESCRIPTION

Figure 1:
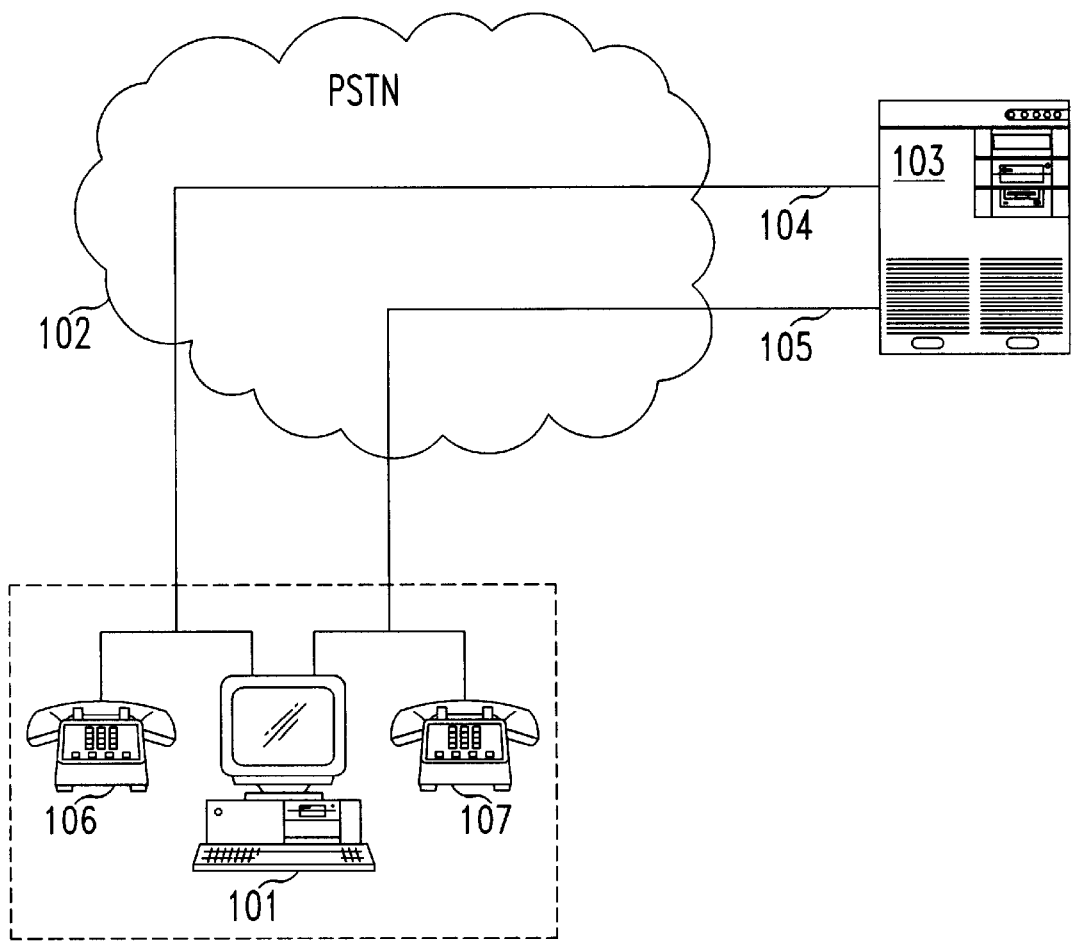
FIG. 1 illustrates a known configuration for implementing a basic bonding scheme for data transmission.
Figure 2:
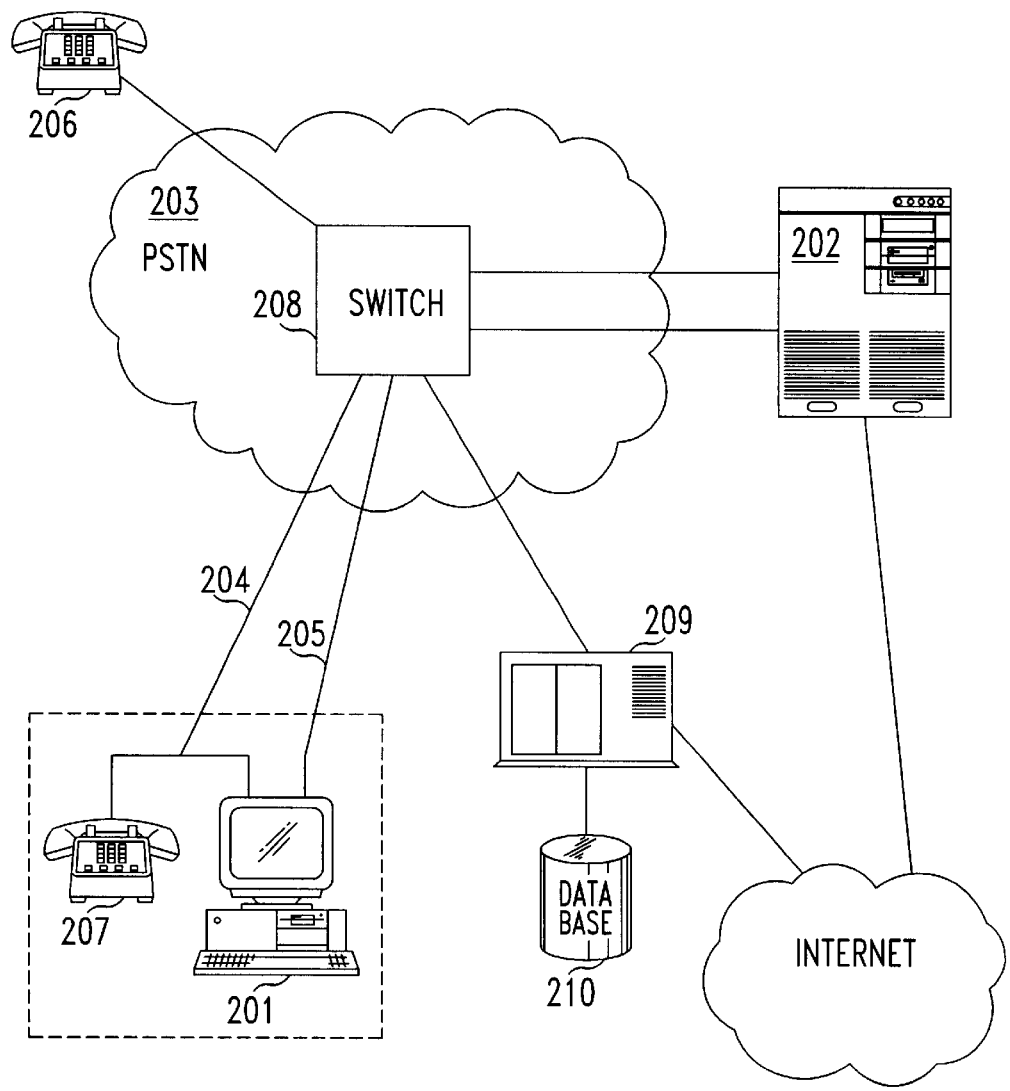
FIG. 2 illustrates an embodiment of the present invention wherein an incoming call is handled.

FIG. 2 illustrates an embodiment of the present invention that allows a user of a bonding scheme for data transmission to receive notice of an incoming call on one of the bonded lines and if desired receive the call on one of those lines without terminating the entire data transmission. The user of computer terminal 201 is a subscriber to a service utilizing the present invention to provide such notification and connection options. Computer terminal 201 uses a bonding scheme to accomplish a network connection with ISP 202 through PSTN 203 via phone lines 204 and 205 and once connected to the network notifies a server 209 that it is online and is using a bonding scheme. A call is placed from telephone 206 to the number assigned to line 204 and telephone 207. When a telephone switch 208 detects that line 204 is currently busy and if the customer at line 204 has subscribed to the notification service of the present invention, the switch redirects the call to server 209. A method for accomplishing this detecting and redirecting of incoming calls is described in U.S. Pat. No. 5,805,587, CALL NOTIFICATION FEATURE FOR A TELEPHONE LINE CONNECTED TO THE INTERNET, issued Sep. 8, 1998, and is incorporated herein by reference. Server 209 accesses a database 210 and retrieves information about the subscriber. This information may simply include the network address of the computer using line 204 and an indicator that the subscriber is online and using a bonding scheme, or it could be a complete subscriber profile containing the subscriber's preferences for what action to take when a call arrives while the line is in use for a bonded data transmission. If the user is online and not merely placing another voice call, the server can use the network address to notify the user at computer 201 via the Internet and ISP 202 of the incoming call. If the user is employing a bonding scheme, the user has the option of connecting the call on one of the bonded lines. If the user elects to have the incoming call connected on line 204, computer 201 notifies the server of the user's desire to connect the call. Computer 201 then reroutes the data traffic from line 204 onto line 205, using known techniques like those of BACP and MP+. After the data traffic has been rerouted line 204 is released by computer 201. The incoming call can then be directed onto line 204 where it can be answered at telephone 207. Computer 201 then checks periodically to determine if line 204 becomes free so that it may be added to the bonded data transmission again if the additional bandwidth is desired.

Figure 3:
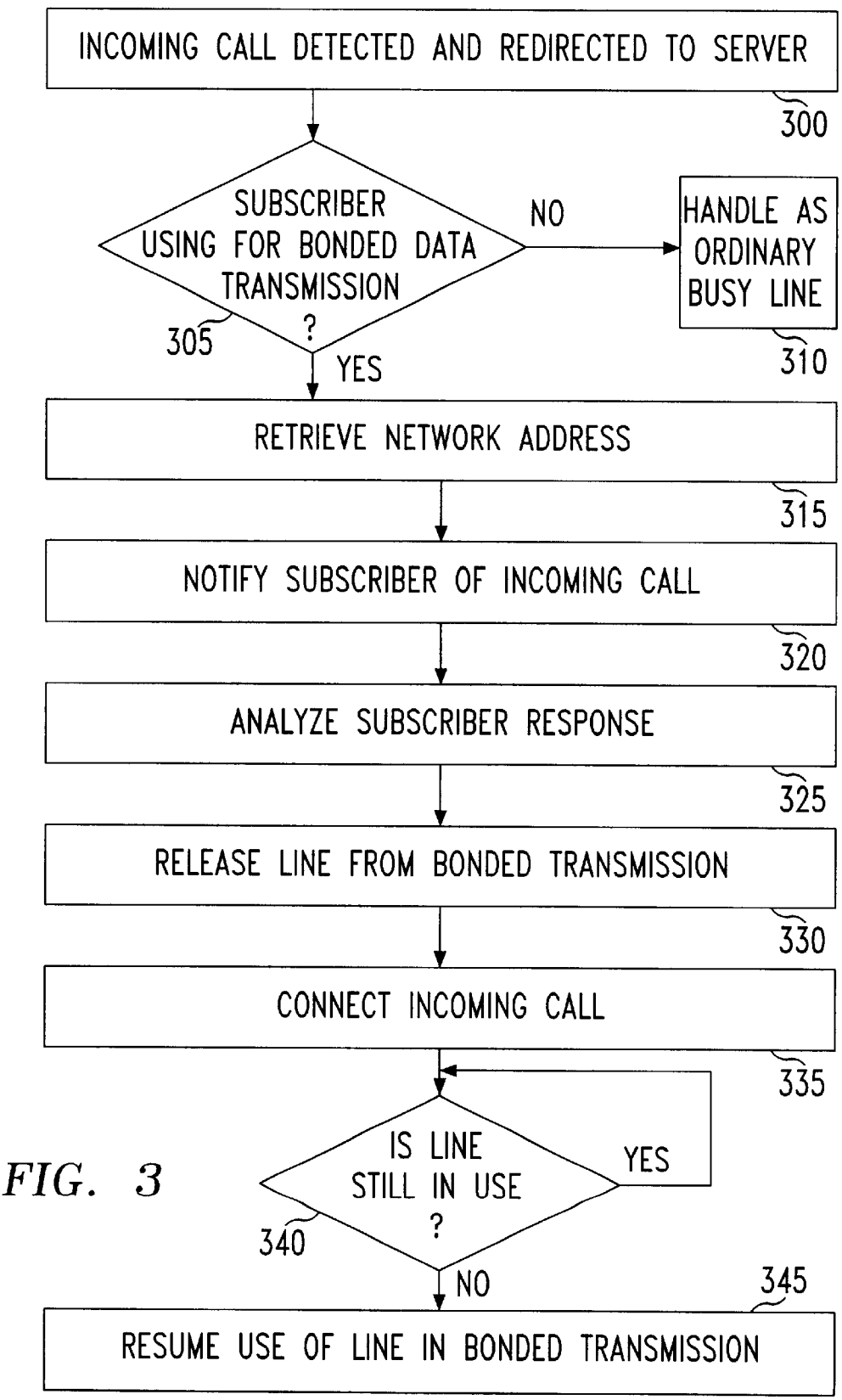
FIG. 3 illustrates a method in accordance with an embodiment of the present invention for handling incoming calls.

FIG. 3 shows a basic process flow in accordance with an embodiment of the present invention that would accomplish the connection of an incoming call when the called party is using a bonding scheme on the line which was called. An incoming call is detected as being destined for a line that is busy and is redirected to a specially configured server (step 300). The server checks whether the owner of the line subscribes to the notification service and is presently using the phone line for a bonding scheme by accessing a database table containing subscriber information (step 305). If either of these conditions is not fulfilled, then the call is handled as it normally would be, i.e. forwarding to a voice messaging service, returning a busy signal to the caller, etc. (step 310). If both of these conditions are fulfilled, the server again accesses the database and retrieves the network address of the computer that is presently using the line for a bonded data transmission (step 315). This network address can be placed in the table in a number of ways including having an agreement with the subscriber's ISP to pass this information along each time the subscriber logs in, or having the subscriber's computer automatically send a message to the server whenever the user starts a bonded connection. Using this network address, the server can send a message via the Internet to the user of the computer indicating that there is an incoming call (step 320). This message could also contain caller identification information. After receiving the message, the user can choose how to proceed from a number of possible options including releasing the phone line for the incoming call, redirecting the call to a voice messaging service, releasing one of the other lines being used for data transmission and directing the incoming call to that line, ignoring the incoming call, transmitting the call through the Internet to the computer via Internet telephony, or directing the incoming call to a phone line not in use for data transmission. The computer returns a message notifying the server of the user's selection (step 325). The server can then connect the call as appropriate based on the user's selection. Since the process of retrieving the network address, sending the notification, and receiving a response may take a considerable amount of time during which the caller could hang up, the system can be implemented so that the caller receives a recording stating, for example, that the called party is being contacted and to please remain on the line.

If the user elected to connect the call on the line originally dialed, the server or the computer can coordinate dropping the line from the bonded connection, using BACP or MP+ for example, and releasing it for the incoming call (step 330). The server can then connect the incoming call through to its originally intended destination (step 335). After a short delay to allow the incoming call to ring through, the computer can periodically check the line to see if it is no longer in use (step 340). Once the line is free the computer can resume using it in the bonding scheme for additional bandwidth as needed (step 345).

Figure 4:
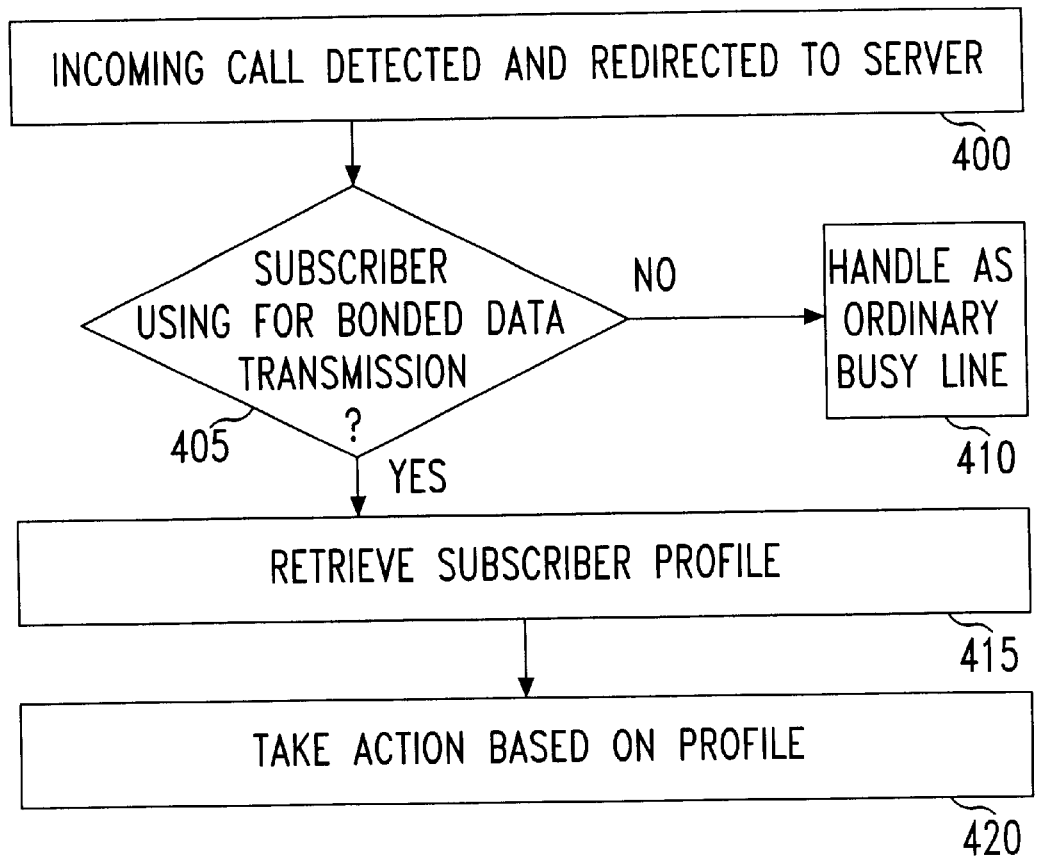
FIG. 4 illustrates an alternative method in accordance with an embodiment of the present invention for handling incoming calls.

FIG. 4 shows an alternative process flow in accordance with an embodiment of the present invention which allows the incoming call to be redirected automatically without notice to or input from the called party based on a set of user preferences maintained by the server. Similar to FIG. 3, an incoming call for a line in use for a bonded data transmission is detected and redirected to a specially configured server (step 400). The server checks whether the owner of the line subscribes to the service and is presently using the phone line for a bonding scheme (step 405). If either of these conditions is not fulfilled, then the call is handled as it normally would be, i.e., forwarding to a voice messaging service, returning a busy signal to the caller, etc. (step 410). Otherwise, the server accesses a database containing a profile for each subscriber to the service as well as the current network address of the subscriber's computer (step 415).

These profiles can contain a variety of information about the subscriber's preferences for handling incoming calls when the subscriber is using a bonded data transmission on the phone line. These preferences can include directions to connect the calls to a voice messaging service, forward the calls to another number, return a busy signal to the caller, automatically drop the line from the bonded transmission and connect the call without prompting the user at the computer, automatically connect via Internet telephony without prompting, or any of these and other options can be selected between by the server based on time of day, day of the week, date, the identity of the caller based on caller id information, or any combination thereof. The subscriber profile could also contain preferences specifying actions to take when the server notifies the computer that there is an incoming call and the computer does not respond, for example when the user has stepped away from the computer during a long download or chooses not to respond to the notification message. Alternatively, the subscriber profile could be stored on the subscriber's computer and accessed via the Internet using the computer's current network address as stored in the database.

Once the server retrieves the profile it takes action based on the preferences contained therein to handle the call appropriately (step 420).

Figure 5:
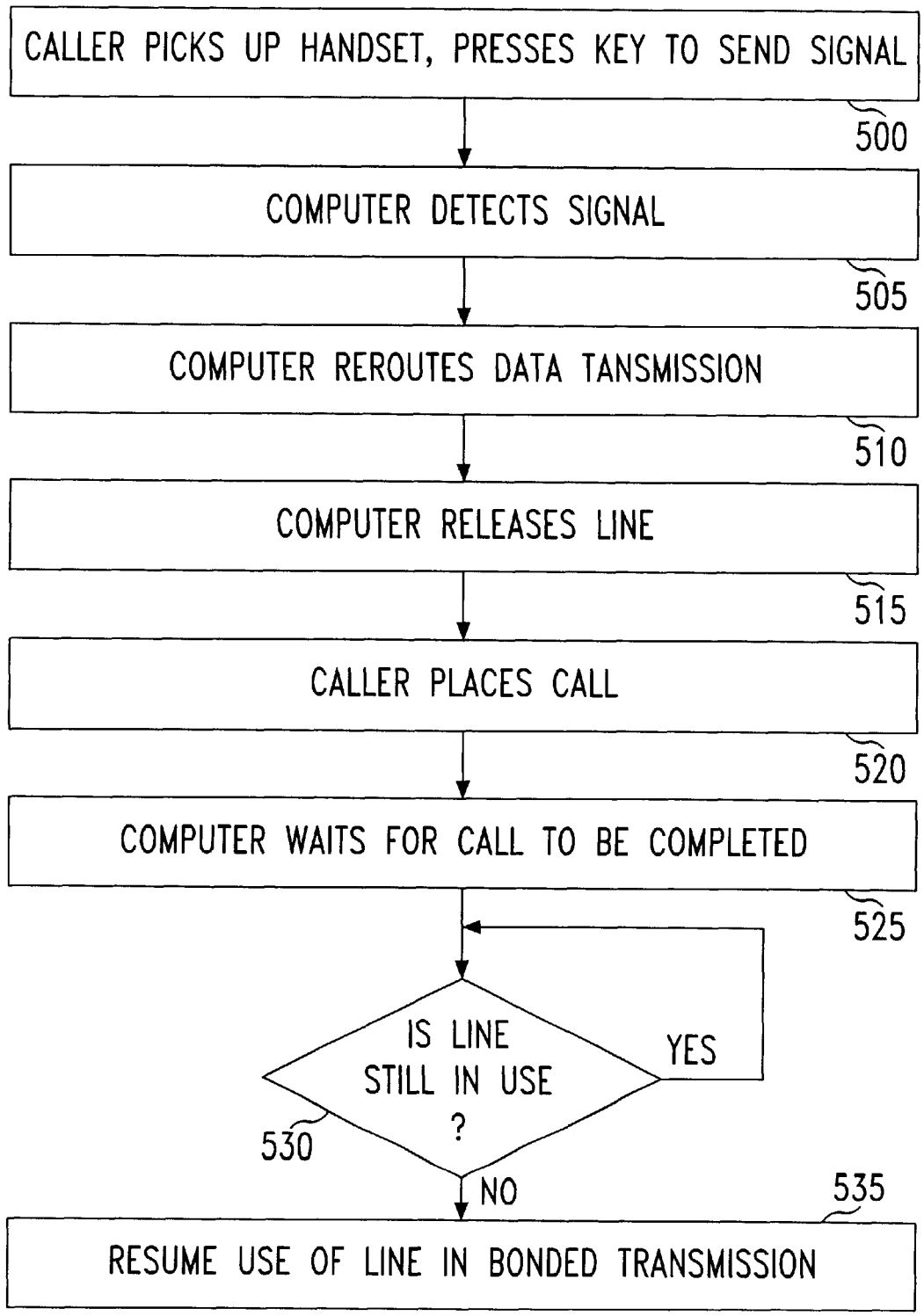
FIG. 5 illustrates a method in accordance with an embodiment of the present invention for releasing a phone line for use for outgoing calls.

FIG. 5 shows a basic process flow in accordance with an embodiment of the present invention that would allow an outgoing call to be placed on a line that is being used in a bonding scheme for data transmission. When an individual wishing to make a call picks up a handset on a line being used in a bonding scheme, he can press a button on the keypad which will send a dual tone multi frequency (DTMF) signal across the line (step 500). This signal can also be sent in other ways including automatically by a specially equipped handset, for example as a 440 Hz call waiting signal over the phone line, over a separate wiring system perhaps utilizing unused phone wiring within the house, via wireless radio or infrared technology, or via the internal power wiring of the house where the phone is located, for example using a Home Automation Control Unit and a Universal Controller by X-10, Inc. of Closter, N.J. The computer employing the bonding scheme detects this signal and realizes that an outgoing call needs to be made (step 505). The computer reroutes all of the data transmission to the one or more other lines being used in the bonding scheme and releases the line (steps 510, 515). If the signal from the phone was transmitted on the phone line, using the call waiting signal for example, the computer or ISP will have to retransmit any data that was corrupted by the signal. This retransmitting is accomplished automatically by most network protocols. The individual wishing to make the call can then hang up the handset and pick it up again to receive a dial tone and place the call as normal (step 520). After a short delay so that the caller will have time to place the call, the computer can periodically check the line to see if it is still in use (steps 525, 530). Once the computer detects that the call has been completed, it can resume using the line in the bonding scheme if the additional bandwidth is needed (step 535).

By allowing an individual to release phone lines from a bonding scheme for ingoing or outgoing telephone calls and add those lines again once the telephone conversation is complete, the present invention allows an individual to enjoy the advantages of using a bonding scheme for data connections without sacrificing the ability to maintain both a data connection and normal telephone use.

The present invention is not limited to the specific implementations described. It is expected that those skilled in the art will be able to devise other implementations which embody the principles of the present invention and remain within its scope.

What is claimed is:

1. A method of releasing a phone line for an outgoing call when said phone line is one of a plurality of phone lines bonded together for data transmission, comprising the steps of:

receiving a signal from a telephone indicating that an outgoing call is desired on a particular phone line of the plurality of phone lines;

redirecting all data transmission on said plurality of phone lines to phone lines other than said particular phone line; and terminating the data transmission on said particular phone line.

2. The method of claim 1 wherein the signal received is a DTMF tone on said particular phone line.

3. The method of claim 1 wherein the signal received is a call waiting signal on said particular phone line.

4. The method of claim 1 wherein the signal is received via wireless communication.

5. The method of claim 1 wherein the signal is received via a signal transmitted across the power lines of the facility where said particular phone line is located.

6. The method of claim 1 further comprising the steps of:

delaying action for a period of several seconds;

periodically checking said particular phone line for activity; and resuming use of said particular phone line for data transmission if no other activity is occurring on said particular phone line.

7. A method for connecting an incoming call on a particular phone line when said particular phone line is one of a plurality of phone lines bonded together for data transmission to a computer, comprising the steps of:

redirecting the incoming call from the particular phone line to a server on the network;

accessing a database to retrieve information related to the particular phone line;

sending a message to said computer indicating the incoming call;

waiting for a response from said computer;

receiving a response from the computer indicating that the incoming call is desired on the particular phone line;

redirecting all data transmission to phone lines other than the particular phone line;

terminating the data transmission on the particular phone line; and connecting the incoming call on the particular phone line without terminating the data transmission.

8. The method of claim 7 wherein the redirecting of the call includes temporarily connecting the call to a recording.

9. The method of claim 7 wherein the information includes the current network address of the computer.

10. The method of claim 7 wherein the information includes a subscriber profile containing preferences for handling incoming calls.

11. The method of claim 10 wherein said preferences include instructions to handle the incoming call based on the identity of the caller as determined by caller id information.

12. The method of claim 11 wherein said preferences include instructions to handle the incoming call based on time of day, day of the week, date, or a combination thereof.

13. A method for connecting an incoming call on a particular phone line when said particular phone line is one of a plurality of phone lines bonded together for data transmission by a computer, comprising the steps of:

redirecting the incoming call from the particular phone line to a server on the network;

accessing a database to retrieve information related to the particular phone line;

in response to retrieving information which indicates that the incoming call should be connected on the particular phone line, redirecting all data transmission to phone lines other than the particular phone line;

terminating the data transmission on the particular phone line; and connecting the incoming call on the particular phone line without terminating the data transmission.

14. The method of claim 13 wherein the redirecting of the call includes temporarily connecting the call to a recording.

15. The method of claim 13 wherein the information includes the current network address of the computer.

16. The method of claim 13 wherein the information includes a subscriber profile containing preferences for handling incoming calls.

17. The method of claim 16 wherein said preferences include instructions to handle the call based on the identity of the caller as determined by caller id information.

18. The method of claim 16 wherein said preferences include instructions to handle the call based on time of day, day of the week, date, or a combination thereof.

* * * * *